United States Patent [19]
Kiani et al.

[11] Patent Number: 6,116,770
[45] Date of Patent: Sep. 12, 2000

[54] MIXING ELEMENT FOR SCREW EXTRUDER

[75] Inventors: Arash Kiani, Upper Saddle River; Frederick R. Burbank, Pompton Plains, both of N.J.

[73] Assignee: Krupp Werner & Pfleiderer Corporation, Ramsey, N.J.

[21] Appl. No.: 09/165,919

[22] Filed: Oct. 2, 1998

[51] Int. Cl.$^7$ .................................................. B29B 7/48
[52] U.S. Cl. ................................................. 366/82; 366/85
[58] Field of Search ................................. 366/79, 81–85, 366/88–90, 319; 425/204, 208, 209

[56] References Cited

U.S. PATENT DOCUMENTS

| | | |
|---|---|---|
| 2,559,418 | 7/1951 | Ford . |
| 3,230,581 | 1/1966 | Tyson et al. . |
| 3,446,485 | 5/1969 | Fischer . |
| 4,343,929 | 8/1982 | Sugio et al. . |
| 5,048,971 | 9/1991 | Wall et al. . |
| 5,230,561 | 7/1993 | Nishimi et al. . |
| 5,302,106 | 4/1994 | Nogossek . |
| 5,419,919 | 5/1995 | Song et al. . |
| 5,429,489 | 7/1995 | Geyer . |
| 5,487,602 | 1/1996 | Valsamis et al. . |
| 5,932,159 | 8/1999 | Rauwendaal . |

FOREIGN PATENT DOCUMENTS

| | | |
|---|---|---|
| 0 330 308 A1 | 8/1989 | European Pat. Off. . |
| 0 483 727 A1 | 5/1992 | European Pat. Off. . |
| 0 529 333 A1 | 3/1993 | European Pat. Off. . |
| 2 312 436 | 10/1973 | Germany . |

OTHER PUBLICATIONS

Krupp Werner & Pfleiderer, "Productivity first. ZSK Mc Twin–screw MEGAcompounders." (Oct., 1998).

*Primary Examiner*—W. L. Walker
*Assistant Examiner*—Als Schwartz
*Attorney, Agent, or Firm*—John G. Gilfillan, III; William Squire

[57] ABSTRACT

A mixing element for a screw extruder comprises an element including opposing lobes and a central portion having common opposing broad surfaces; one lobe broad surface being formed into a taper. The elements may be used individually or combined in blocks, with the elements of a block oriented in various combinations. The blocks may comprise two or more elements. The tapered lobes provided reduced pressure and temperature of the process as compared to prior art mixing elements. Also, more graduated control over temperature and pressure are provided according to the value of the taper magnitude, the number of elements used in a process and the relative lobe orientations in a machine.

21 Claims, 4 Drawing Sheets

MIXING ELEMENT FOR SCREW EXTRUDER

This invention relates to mixing elements for use in screw extruders.

Such extruders have mixing elements which have blunt mixing surfaces which tend to generate heat due to the energy input provided as the elements rotate. Such heat can generate temperatures in excess of that desired for a given material being mixed.

The present inventors recognize a need for a mixing element which can provide reduced input energy and thus heat the material to a lesser degree than prior art elements.

A mixing element for a screw extruder defining an extrusion axis having an axially extending screw shaft according to the present invention comprises a mixing member comprising a central portion defining a root diameter with a shaft receiving bore for rotating the member about the axis and first and second end lobes extending radially from the central portion.

The member has opposing first and second surfaces, each end lobe having a distal end surface, a lateral side edge surface extending across each side of the central and end lobes, said first surface in said first end lobe tapering toward the second surface in a direction toward the end surface of the first end lobe.

In one aspect, an annular flange shoulder extends from at least one of said first and second surfaces in the central lobe.

In a further aspect, the first end lobe first surface tapers about 45° to said second surface.

The first end lobe first surface taper may define a surface of revolution.

A mixing element for a screw extruder defining an extrusion axis having an axially extending screw shaft in accordance with a still further aspect of the present invention comprises a plurality of contiguous members secured to one another.

In another aspect, the first end lobe of a first member is next adjacent to the second end lobe of a second next adjacent member.

The first and second end lobes of a first member define a first axis therethrough and the first and second end lobes of a second member define a second axis therethrough in a further aspect, the first axis lying in a first plane angularly displaced from a second plane in which the second axis lies.

The first and second axes may be normal or may be oriented about 45° relative to each other.

The members preferably overly one another in a given plane.

IN THE DRAWING

In screw extruders, a plurality of mixing barrels are provided for mixing various materials. Such materials may include thermoplastics, rubber polymers and all other materials with viscoelastic flow characteristics.

Figure 1:
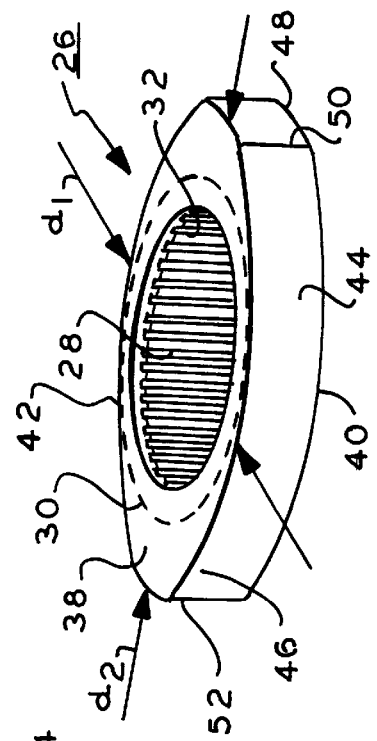
FIG. 1 is a diagrammatic representation of a prior art screw extruder apparatus.
Figure 8:
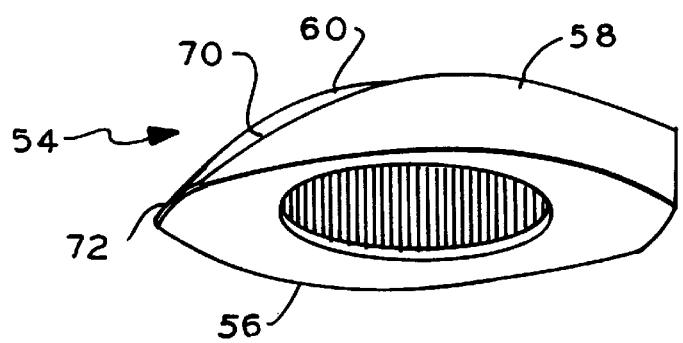
FIG. 8 is an isometric top view of the element of FIG. 4.

In FIG. 1, for example, a prior art extruder 2 comprises an axial array of barrels 4, 5, 6 and 7 which are secured together. The barrels define an axially aligned bore 8 in a FIG. 8 configuration for receiving twin rotating screws 10. The bore 8 and screws 10 are normal to the bore axis for providing a second feed location for the input materials. The bore 8 and screws 10 are normal to the orientation of the twin screw and bore (not shown) of the barrels 4–7. A drive shaft 12 drives the twin screws (not shown) which typically are co-rotating, but may counter-rotate. The apparatus comprising the barrels, which are modular, and may be assembled in any order and number, shaft and screws are commercially available from Krupp Werner & Pfleiderer Corporation, model number ZSK 40, for example, with a side feeder model ZSB 40 containing screws 10. A drive mechanism 14, which is conventional and available as Krupp Werner & Pfleiderer Corporation model ZSK 40 drives the shaft 12. Hoppers 16 and 17 provide the raw material to be mixed via an extruder inlet hopper 20.

Figure 2:
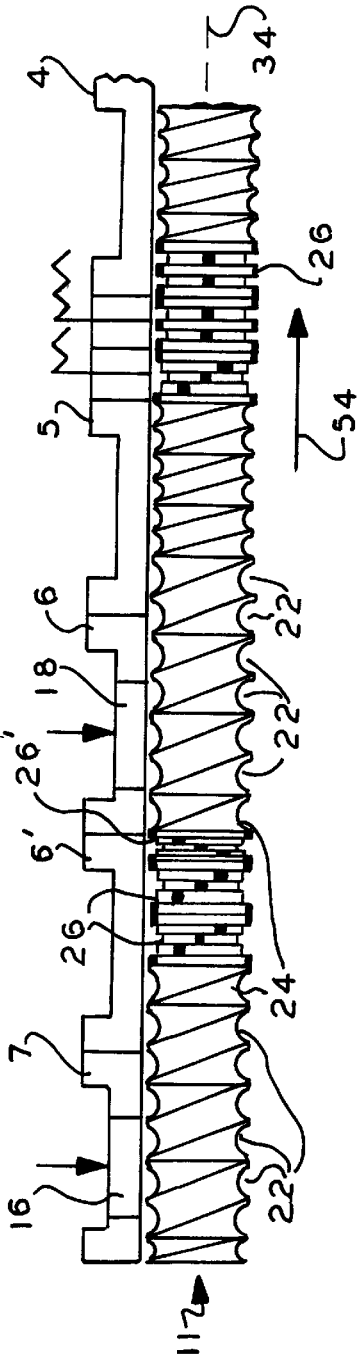
FIG. 2 is a diagrammatic sectional view of a prior art screw arrangement employed in the apparatus of FIG. 1.

In FIG. 2, barrels 4–7 and a representative screw 11 of the twin screws employed in the barrels 4–7, FIG. 1, are shown. A further barrel 6' is also included. Barrel 7 receives input material through port 16. Barrel 6 may also receive input material through port 18.

The screw 10 comprises a plurality of helix thread modular screw elements 22 and 24 of different axial extents. The elements are arranged in various axial lengths and combinations according to the operation desired as known.

Disposed in barrel 6' and in barrel 4 are mixing elements 26 in various orientations and combinations. The elements in each barrel are juxtaposed and contiguous in relative orientations as desired for a given mixing operation.

Figure 3:
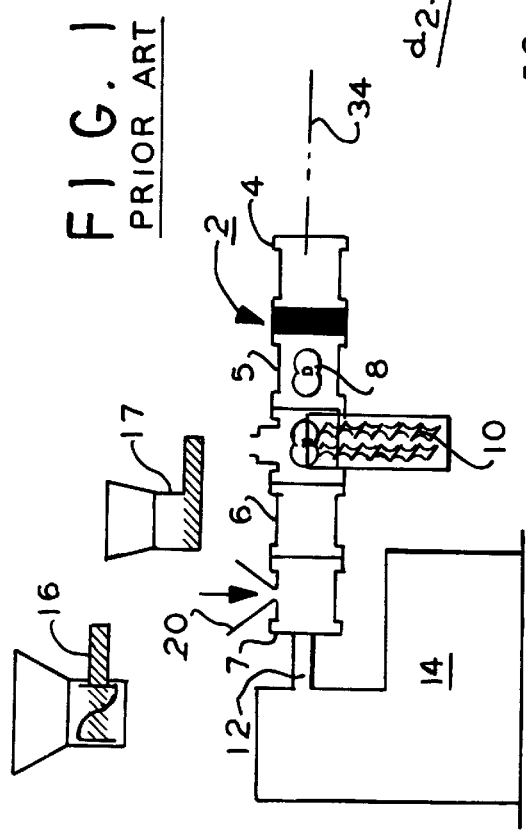
FIG. 3 is an isometric view of a representative mixing element employed in the embodiments of FIGS. 1 and 2.

In FIG. 3, representative mixing element 26 will be described. Element 26 may comprise a hardened nitrided tool steel or other alloy plate having a central bore 28 in a root diameter region 30. The bore 28 has splines 32 which mate with splines on the shaft 12, FIG. 1, so the shaft 12 can rotate the element 26 about the shaft axis 34.

The element 26 has two opposing broad surfaces 38, 40 and two opposing lateral side walls 42 and 44 in mirror image relation. The side walls 42, 44 taper toward each other at the element end regions. The element 26 has two end lobes 46, 48 which extend radially in opposite directions from the central portion containing the bore 28. The lateral side walls 42 and 44 are curved, for example, each being defined by a radius that is the same for each side wall 42, 44. e.g., about 33 mm for an element that lies on a circular diameter $d_2$ of about 40 mm in one embodiment. The element may have a maximum width $d_1$ for example of about 26 mm between the side walls across the bore 28 center.

The element 26 has a thickness such that the side walls 42 and 44 are blunt, e.g., about 0.75 mm thick. The end surfaces 50 and 52 are identical mirror images and lie on a circle, e.g., about 40 mm in diameter. This is the diameter of the barrel bores of the extruder 2, FIG. 1, corresponding to the designation as a ZSK 40. Thus the end surfaces 50 and 52 wipe against the applicable barrel bore surface.

In a twin screw extruder, the elements 26 of the two screws interengage with the end surfaces 50 and 52 wiping against mating lateral side wall surfaces on the mixing elements of the adjacent screw. In FIG. 2, for example, the end surfaces 50, 52 of the elements 26 are shown as black squares. The elements of the two adjacent screws are thus complementary so as to wipe against each other during rotation to effect a kneading action of the material being mixed and extruded. Not shown are extrusion dies at the exit port of barrel 4, FIG. 2, on axis 34 for extruding the mixed material in direction 54.

In FIG. 2, various orientations of the elements 26, which are referred to as two lobe elements, are shown for a given implementation. However, the prior art also includes three lobe elements, not shown, which are generally triangular in plan view rather than elongated as elements 26. Also, elements 26' are thinner than elements 26. The elements 26 and 26' are each arranged in sets of five elements with the contiguous elements oriented 45° relative to the orientation of the next element so as to simulate a helix screw thread in barrel 6'. There are two sets of elements 26 and one set of elements 26' in barrel 6', the orientation of elements 26' being opposite to that of elements 26, by way of example. The elements 26 of barrel 4 are arranged in different set orientations as shown.

These sets of elements act as a screw thread and push the material in the direction 54 during the kneading action. The elements of the adjacent screws in a barrel have the same pitch and 90° orientation relative to each other to insure the end surfaces 50 and 52 of one screw wipe against the lateral side wall 42, 44 surface of the other screw element axially aligned therewith. The pitch of the elements 26 thus follow the crest of a helix whereby the elements of the adjacent screws mesh exactly with each other. In these elements the broad surfaces 38 and 40 are parallel. In some elements, an upwardly extending annular spacer shoulder or rib (not shown) may be present in the root diameter region 30.

In a typical element the shear rate of the material as sheared by the elements 26 is defined by the equation:

$$\text{Shear Rate} = \frac{\pi \times D \times \text{speed (shaft rpm)}}{\text{gap}(g)} \times \frac{\text{seconds}}{60} \qquad 1)$$

where (see FIGS. 4 and 5):

$$D = \frac{d_1 + d_2}{2} \qquad 2)$$

and g is the gap between adjacent elements at the broad surfaces 38 and 40. Where there is an annular shoulder in the root diameter region, such a shoulder will provide a gap typically at about 0.75 mm in height. This height value is dependent upon the bore diameter of the associate extruder barrel. The shoulder has a surface parallel to the surfaces 38 and 40, and whereas the flat surfaces 38 and 40 of respective abutting elements 26 will normally abut and exhibit a negligible gap g.

Energy input is defined:

3) E=viscosity of material×shear rate² at T°C. (Kw) Thus as the gap g increases, the shear rate decreases and the energy expelled during the mixing is decreased quadratically. To determine the temperature rise:

4) E=M (flow rate kg/sec)×heat capacity (Kw/Kg/°C.)× change in temperature (delta T°C.) (inlet vs. outlet temperatures as measured)=energy consumption The problem with the elements 26 is that there is a limit on the amount of energy reduction or control over the energy that can be provided with such elements. The changes in energy levels are possible in incremental steps wherein the incremental changes in energy consumption are relatively large regardless of the arrangement of the elements in different combinations. This incremental change in energy affects the temperature of the material being mixed and/or its pressure which is also a function of the relative energy involved.

The energy level affects the temperature and pressure of a material such that undesirable agglomerates may be formed at certain shears at too high a pressure. This creates larger particles which is a defect in the final product. Temperature controllers are employed in the prior art to maintain temperature and effect heat transfer. It is necessary to empirically determine the desired pressure and temperature when the prior art elements 26 do not produce the desired control. Then the temperature needs to be controlled accordingly.

Figure 4:
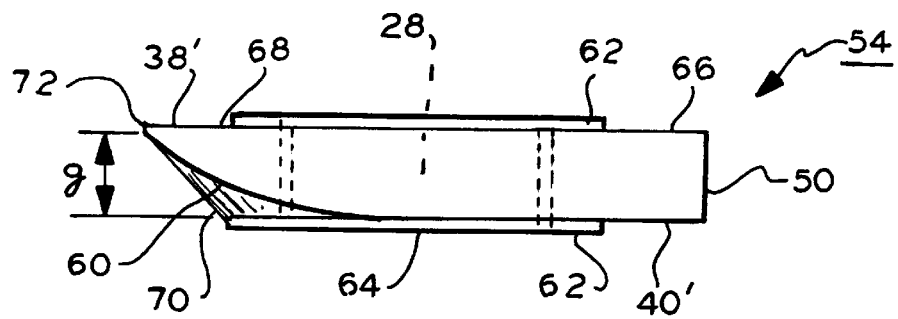
FIG. 4 is a side elevation view of a mixing element according to an embodiment of the present invention.
Figure 5:
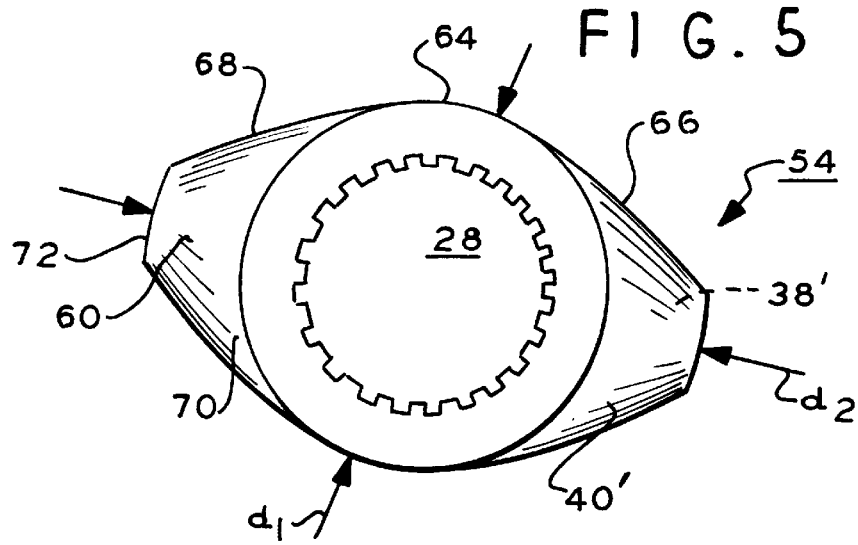
FIG. 5 is a bottom plan view of the element of FIG. 4.

In FIGS. 4, 5, 7 and 8, element 54 according to the present invention is shown. Reference numerals that are the same for element 26, FIG. 3, represent identical components. The element 54 is of material, has the overall shape and dimensions that are the same as element 26. The lateral side walls 56 and 58 have the same curvature, the element has the same length and thickness and the bore 28 is the same as element 26. The plan view outer peripheral profile, FIG. 5, is thus the same as for element 26. Element 54 has a plane of symmetry that bisects broad surfaces 38' and 40' and intersects end surfaces 50 and 72.

The difference between element 54 and element 26 is that element 54 has a broad planar surface 40' that tapers at taper 60. In addition, the aforementioned optional upstanding root diameter spacer shoulder 62 is shown for element 54. A shoulder 62 is on each of the opposing broad surfaces 38' and 40'. Surface 40' is otherwise the same as surface 40 of element 26 notwithstanding the presence of the taper 60 in broad surface 40' and shoulder 62 of element 54. Surface 38' is the same as surface 38 notwithstanding shoulder 62. The element 54 has a central portion 64 and two end lobes 66 and 68.

The taper 60 is generally about at 45° in this embodiment but could be at other angles according to a given implementation. The surface 70 of the taper 68 is preferably defined by a surface of revolution, a portion of a circular cylinder and thus is curved and not flat. However, a flat surface, other curvatures, or faceted taper may be employed in certain implementations. The surface 70 terminates at an end surface 72 which is relatively narrow. The taper forms a gap g, FIG. 4, which gap has a linear distance value that manifests the magnitude of the triangular area between the extended plane of surface 40' and surface 70 for a 45° taper formed by a portion of a circular cylindrical surface 60 (FIG. 4). This area is in the plane of the drawing figure sheet. This gap g is significantly larger than that produced by the prior art element 26. The setting of the value of the gap g manifesting a given taper angle and configuration for a given element thickness between the broad surfaces such as surfaces 38' and 40' thus provides a control over the energy provided by the element 54 in a manner not previously possible.

Because the taper may be at any desired angle, the gap g value manifesting a desired area may be set accordingly. Also, the combination of the elements 54 provides various gaps not previously possible with the elements 26. While one tapered end lobe is shown, both end lobes may also be tapered as desired for a given implementation. To maintain the self wiping condition, only one taper is preferred due to the thin end surface 72 of the tapered end lobe 68. The number of tapered elements determines the energy input of the extruder 2. Thus by changing the number of tapered elements employed, the energy levels are capable of being set to a wider degree than otherwise possible.

This energy control is important for polymer materials, e.g., plastics or elastomers, to control the temperature and/or pressures. By controlling the maximum temperature according to the configuration of the tapered element lobes, the end properties of the mixed material may be properly set. To provide control over the process the variables including the number of elements, the angular orientation of the elements to each other, and the number of tapered elements are determined for a given process.

The tapers provide an increased working volume for a given throughput rate, and provide an increase in the incremental time the material is processed. This can be important in reactive processes which require a certain time to achieve the material melt blend. For example, in conversion of monomers to polymers or polymers to polymers, the conversions are a function of reaction times and residence time. The tapered elements provide enhanced control over these variables. That is the taper provides increased resident time and reduced pressure which may reduce temperature to permit an optimum profile for a given application.

Figure 9:
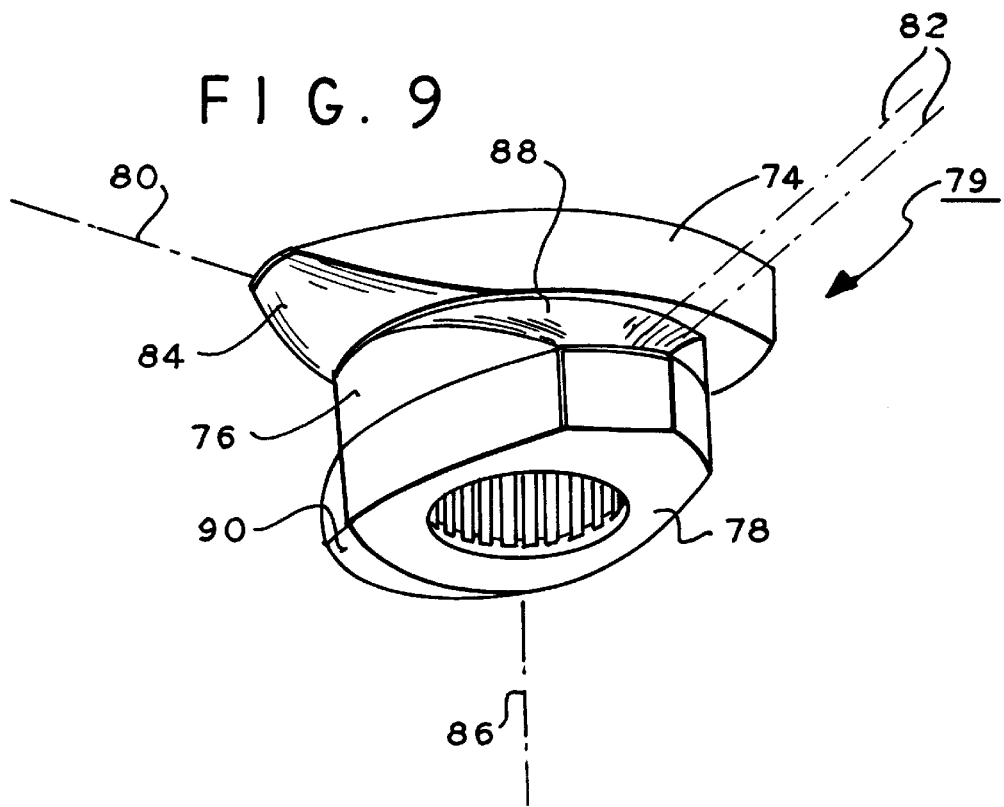
FIG. 9 is an isometric view of a second embodiment of a plurality of elements of FIG. 4 secured in a second arrangement to form a combined element.

The elements 54 may be installed as single units or fabricated as blocks. For example, in FIG. 9, three elements 74, 76 and 78 identical to element 54 are secured, e.g., bonded, as a block 79 with their broad surfaces abutting with no root diameter shoulders therebetween. In the alternative, the block 79 may be fabricated as a one piece integral structure. Element 74 has its longitudinal axis 80 oriented 90° from the axis 82 of elements 76 and 78. The taper 84 faces in one shaft axis 86 direction. The axes 82 of elements 76 and 78 are aligned in the direction of axis 86 as shown in FIG. 9. The taper 88 of element 76 and the taper 90 of element 78 face in the opposite direction along axis 86, with the taper 90 facing in the same direction as the taper 84 of element 74. The tapered lobe of element 76 is diametrically opposite the position of the tapered lobe of element 78.

Figure 6:
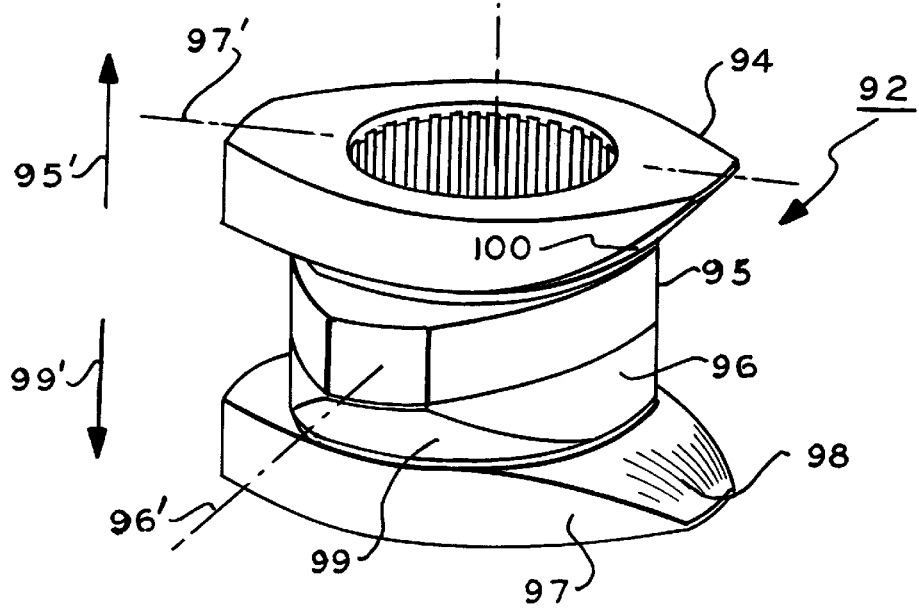
FIG. 6 is an isometric view of a plurality of the elements of FIG. 4 secured in one arrangement to form a combined mixing element.
Figure 7:
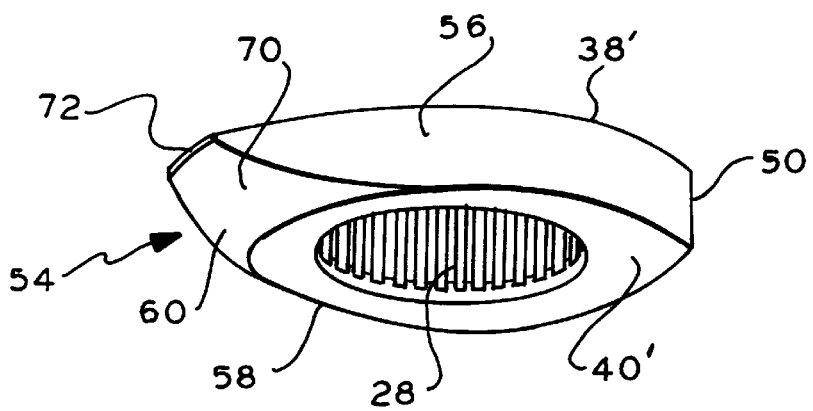
FIG. 7 is an isometric bottom view of the element of FIG. 4.

In FIG. 6, a four element block 92 comprises elements 94, 95, 96 and 97. These elements are identical to element 54. Elements 94 and 97 have their tapered lobes in spaced overlying relation with the respective tapered surfaces 100 and 98 facing each other. The tapered surface of the tapered lobe of element 95 (not shown in the figure) faces in the same axial direction 95' as the surface of taper 98 of element 97. The tapered surface 99 of the tapered lobe of element 96 faces in the same axial direction 99' as the surface of taper 100 of element 94.

The lobes of the elements 95 and 96 are oriented in the same axial direction along the respective element longitudinal axis 96' (one axis being shown) with their tapers facing in opposite directions 95' and 99', respectively. The lobes of elements 95 and 96 are on axis 96'. The elements 95 and 96 lobes are oriented 90° from the axis 97' of the lobes of elements 94 and 98. The lobes of elements 94 and 98 extend in an axial direction along element longitudinal axis 97'. The lobes of elements 94 and 98 also are in the same axial orientation but with their tapers facing in opposite directions 99' and 95', respectively. In other embodiments, the element longitudinal axes, such as axes 96' and 97', of the different next adjacent elements may lie in orientations different than 90°, e.g., 45°.

Figure 10:
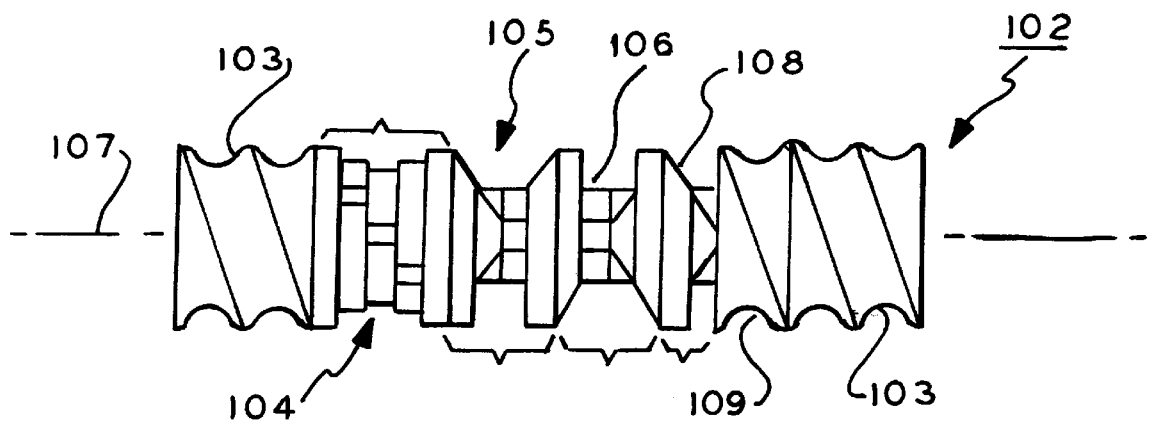
FIGS. 10 and 11 are side elevation views of two different screw arrangements employing a plurality of the elements of FIG. 4 in different combinations and orientations for use in the extruder of FIG. 1.

In FIG. 10, screw 102 comprises conventional helix screw portions 103 and 104. Conventional mixing elements 104 in a block of five elements as described above are next to the helix screw portion 103. Blocks 105 and 106 are identical and each comprise four elements 54. These are the same as block 92, FIG. 6. Blocks 105 and 106 are oriented 180° apart about the shaft axis 107. Block 108 has two element and is oriented about axis 107 as shown in the figure. The splines of the elements maintain the element orientation about the shaft 107 as known.

Figure 11:
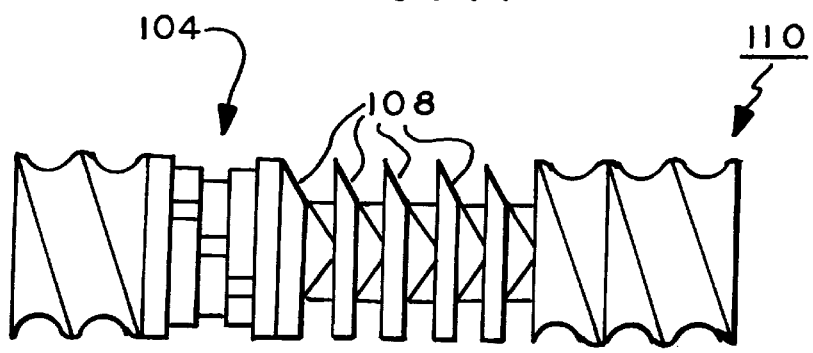

In FIG. 11, screw 110 comprises a block 104 and a series of blocks 108 arranged in parallel and the same angular orientation.

The blocks 105 and 106 provide reduced shear forces with more leakage between the elements. High pressure is minimized and provides low pressure which is important for certain materials. 100% wiping for the barrel surfaces and good leakage is provided to minimize pressure build up. The full wiping occurs with the non-tapered lobes of the elements.

PROCESS EXAMPLE

EPDM Uniroyal IM 1700
Carbon Black Cabot N650

The EPDM was fed into barrel 7 (see FIG. 2 for position of barrels) and melted masticated in the kneading blocks in the next barrel 6'. The carbon black was fed into barrel 6. Samples were collected with the blended material. The barrels were preheated to 75° C. No cooling was on. The EPDM was fed at 75 Lb. per Hr (pphr). The carbon black was fed at 40 pphr.

The following combinations were evaluated.
1. 80 mm axial length along axis 34, FIG. 1, of conventional kneading elements at the beginning of barrel 5.
2. 80 mm of tapered elements, FIG. 11, along the axial length of axis 34, FIG. 1, replacing the conventional kneading blocks in an orientation with their tapers all facing in the same shaft 12 axial direction (axis 34, FIG. 1) with the lobes of each element oriented 90° with respect to the next adjacent element similar to axes 96' and 97', FIG. 6.
3. 80 mm axial length along axis 34, FIG. 1, of tapered elements arranged in 90° orientations per FIGS. 6 and 10, replacing the conventional kneading blocks.
Results The conventional elements exhibited the highest specific mechanical energy (SME) and produced the highest stock temperature in the material.

The second combination resulted in significant reduction in both SME and stock temperature with both materials processed. The third combination resulted in even greater reduction in SME and stock temperature. All samples were uniformly masticated and/or mixed.

It will occur to one of ordinary skill that various modifications may be made to the disclosed embodiments. It is intended that the scope of the invention is as defined in the appended claims. For example, the number of elements, the number of tapered lobes, their orientation and the amount of taper is determined according to a given implementation. The number of lobes also may be according to a given implementation, e.g., three lobes in a triangular orientation rather than the two lobe configurations in an axial orientation as shown. In a triangular configuration, the end surfaces of the lobes may be narrower than the end surfaces of a two lobe configuration. More or fewer lobes may be provided. The thicknesses, lengths, curvatures of the elements are all given by way of example and depend upon the bore diameter or other parameters of a given screw extruder or process.

What is claimed is:

1. A mixing element for a screw extruder defining an extrusion axis having an axially extending screw shaft comprising:

a plurality of contiguous members secured to one another;

each member including:

a central portion defining a root diameter with a shaft receiving bore for rotating the member; and first and second end lobes extending radially from the central portion;

each member including said end lobes and central portion having opposing first and second broad surfaces and opposing lateral sides, said first and second broad surfaces lying in parallel planes along said axis, each end lobe having a distal end surface, each of said lateral sides having a surface extending across each side of the central portion and between the end lobes, said first broad surface tapering toward the second broad surface defining a tapered surface lying between said parallel planes at the end surface of the first end lobe;

said member having a plane of symmetry; and said shaft receiving bores of said members being coaxial for receiving said shaft.

2. The element of claim 1 wherein the members overlie one another in a given plane.

3. The element of claim 2 wherein the end lobes of two adjacent members are juxtaposed.

4. The element of claim 3 wherein the tapered surface of each of the juxtaposed members face in opposite axial directions along said axis.

5. The element of claim 4 wherein the first end lobe of a first element is juxtaposed with the second end lobe of a second element and the tapered surfaces face in opposite directions.

6. The element of claim 4 wherein the tapered surface of a first of said two adjacent members is angularly displaced from the first end lobe of a second of said two adjacent members about said shaft receiving bore.

7. The element of claim 4 wherein the two adjacent members each lie in a plane and including a plurality of said two adjacent members secured to each other with their respective planes in parallel relation.

8. The element of claim 3 wherein the tapered surface of each of the juxtaposed members face in the same axial direction along said axis.

9. The element of claim 1 wherein the first and second end lobes of a first member define a first axis therethrough and the first and second end lobes of a second member define a second axis therethrough, the first and second axes each having an orientation, the first axis orientation being angularly displaced from the second axis orientation.

10. The element of claim 9 wherein the first and second axes are normal.

11. The element of claim 9 wherein the first and second axes are oriented about 45° relative to each other.

12. The element of claim 1 including three of said members arranged in coaxial relation, the broad surfaces of each of said three members having non-tapered portions, two of said members being secured in back-to-back relation with the non-tapered portions thereof abutting and with each said tapered surface of the two members facing in opposite axial directions and juxtaposed at the end lobes of the two members, and a third of said members being secured in said coaxial relation to one of said two members in overlying relation thereto and being oriented with its first and second end lobes angularly displaced about said shaft receiving bore relative to the two members.

13. The element of claim 12 further including a fourth member secured to the other of said two members in mirror image relation to the third member.

14. The element of claim 12 including a plurality of sets of said three members oriented in the same angular orientation about the axis through said bores.

15. The element of claim 1 wherein the first end lobe of a first member is next adjacent to the second end lobe of a second member.

16. A mixing member for a screw extruder defining an extrusion axis and having an axially extending screw shaft comprising:

said mixing member comprising:

a central portion defining a root diameter with a shaft receiving bore for rotating the member about the axis;

first and second end lobes extending radially from the central portion;

said member including said end lobes and central portion having opposing first and second surfaces and opposing lateral sides, said first and second surfaces lying in parallel planes along said axis, each end lobe having a distal end surface, each of said lateral sides having a surface extending across each side of the central portion and between the first and second end lobes, said first surface tapering toward the second surface defining a first surface taper lying between said parallel planes at the distal end surface of the first end lobe; and said member having a plane of symmetry.

17. The member of claim 16 including an annular flange shoulder extending from at least one of said first and second surfaces in the central portion.

18. The member of claim 16 wherein the first surface tapers about 45° to said second surface.

19. The member of claim 16 wherein the first surface taper defines a surface of revolution.

20. A screw extruder comprising:

a barrel having a first bore defining a mixing axis for receiving material to be extruded;

a rotatably driven shaft in the bore on the axis; and at least one mixing member for mixing said received material comprising:

a central portion defining a root diameter with a shaft receiving bore releasably engaged with the shaft, said shaft for rotating the at least one mixing member about the axis; and first and second end lobes extending radially from the central portion relative to the shaft receiving bore;

said at least one mixing member including said end lobes and central portion having opposing first and second surfaces and opposing lateral sides, said first and second surfaces lying in parallel planes along said axis, each end lobe having a distal end surface, each of said lateral sides having a surface extending across each side of the central portion and between the end lobes, said first surface tapering toward the second surface defining a first surface taper lying between said parallel planes at the end surface of the first end lobe; and said member having a plane of symmetry.

21. The extruder of claim 20 including a plurality of said at least one mixing member secured to the shaft in next adjacent juxtaposed relation.

* * * * *